_UNITED STATES PATENT OFFICE._

HENRY BLUMENBERG, JR., OF LOS ANGELES, CALIFORNIA, ASSIGNOR TO CHEMICAL CONSTRUCTION COMPANY, OF LOS ANGELES, CALIFORNIA, A CORPORATION OF CALIFORNIA.

PROCESS OF EXTRACTING POTASSIUM SALTS FROM FELDSPAR.

1,296,457. Specification of Letters Patent. Patented Mar. 4, 1919.

No Drawing. Application filed July 23, 1917. Serial No. 182,250.

*To all whom it may concern:*

Be it known that I, HENRY BLUMENBERG, Jr., a citizen of the United States, residing at Los Angeles, in the county of Los Angeles and State of California, have invented new and useful Improvements in Processes of Extracting Potassium Salts from Feldspar, of which the following is a specification.

My invention relates to a process of extracting potassium salts from insoluble aluminum potassium silicates, such as orthoclase, lepidolite, and the like.

Various processes have been known in the art for extracting potassium salts from feldspar and the like, but so far as I am aware, none of them have been a commercial success for the reason that the reagents used in the process are either too expensive, or high temperatures are necessary to break up the feldspar to render the potassium salts available, or the final process of separation involves filtration and crystallization.

I have devised a process for extracting potassium salts from feldspar and the like which uses inexpensive reagents, avoids high temperatures, and produces a product in which the potassium salts are present as potassium sulfate, while the remainder of the mass is insoluble. The soluble potassium sulfate may be usually extracted from the mass by the simple process of leaching.

My invention consists in the steps of the process hereinafter described and claimed.

I take one part of feldspar, finely pulverized and passed through a 200 mesh screen, one part of gypsum, finely pulverized, and one part of acid sludge, the latter being a well-known by-product of the mineral oil industry and containing from 30% to 60% of sulfuric acid. These ingredients are thoroughly mixed and form a thick, pasty mass. The mixture is heated in the presence of air for several hours to a temperature of 700° to 800° C. The sulfuric acid of the acid sludge combines with the aluminum of the feldspar to produce aluminum sulfate. It is also advisable to use an excess of air to pass over the heated mass so that the carbonaceous material contained in the acid sludge will not reduce the sulfate produced to sulfids. When aluminum sulfate has been produced, the temperature is raised beyond the dissociation point of the feldspar, requiring a temperature of about 800° to 1000° C., at which the aluminum sulfate is decomposed into aluminum oxid and $SO_3$ and the feldspar, in the presence of calcium sulfate and hydrocarbon sludge, is broken down to form potassium sulfate and aluminum calcium silicate. The mass is cooled and its physical property resembles that of a cement clinker, which can be easily broken up and the potassium sulfate, which is the only soluble salt contained therein, may be easily leached out by means of water, and then concentrated to a solid form by any preferred method.

The advantage of using the acid sludge is in utilizing an inexpensive waste product which contains sulfuric acid and carbonaceous material, the burning of the latter furnishing the necessary heat units to carry on the reaction, which is superior to the use of calcium sulfate with feldspar alone.

Another advantage of my process over similar processes that use the sulfates and acid sulfates of the alkali metals, is that the reaction is effected with a small amount of sulfuric acid or sulfates. In processes using sulfates, or acid sulfates of the alkali metals it is necessary to have at least from three to four parts of the acid sulfate in proportion to one part of the feldspar to effect a complete reduction of the latter.

I am fully aware that if the mixture of feldspar, calcium sulfate and acid sludge is calcined only up to 700° C. that an aluminum potassium sulfate is produced (so-called potassium alum) which may be leached out and crystallized.

In my process, the only soluble salt that is formed is potassium sulfate, as aluminum and calcium silicates are insoluble.

As will be readily seen, my process will be useful in either making the potassium sulfate or the potash alum salt, it depending solely upon the manipulation of the heating of the mass. If the temperature is kept below 700° C., approximately, the aluminum sulfate in the mass is not decomposed. If it is brought above this point, $SO_3$ gases are liberated and the aluminum calcium silicate, as above described, is the resultant mass.

While I have described my process in connection with feldspar, it will be understood that other minerals or materials containing potassium may be treated in the same manner, and in place of the calcium sulfate, barium sulfate or any of the alkaline earth metal sulfates.

Various changes in the process may be made by those skilled in the art without departing from the spirit of my invention.

I claim:

1. A process of extracting potassium from feldspar and the like, comprising mixing powdered feldspar and powdered calcium sulfate with acid sludge and heating the same in the presence of air to form potassium sulfate and insoluble calcium aluminum silicate, and leaching the soluble potassium sulfate from the mass.

2. A process of extracting potassium from potassium containing materials, comprising mixing a potassium containing material with a sulfate of an alkaline earth metal and acid sludge, heating the same in the presence of air to form a soluble potassium salt, and separating said potassium salt from the mass.

In testimony whereof I have signed my name to this specification.

HENRY BLUMENBERG, Jr.